Aug. 28, 1956  L. I. YEOMANS  2,760,755
AUTOMOBILE WALKER
Filed Dec. 11, 1952
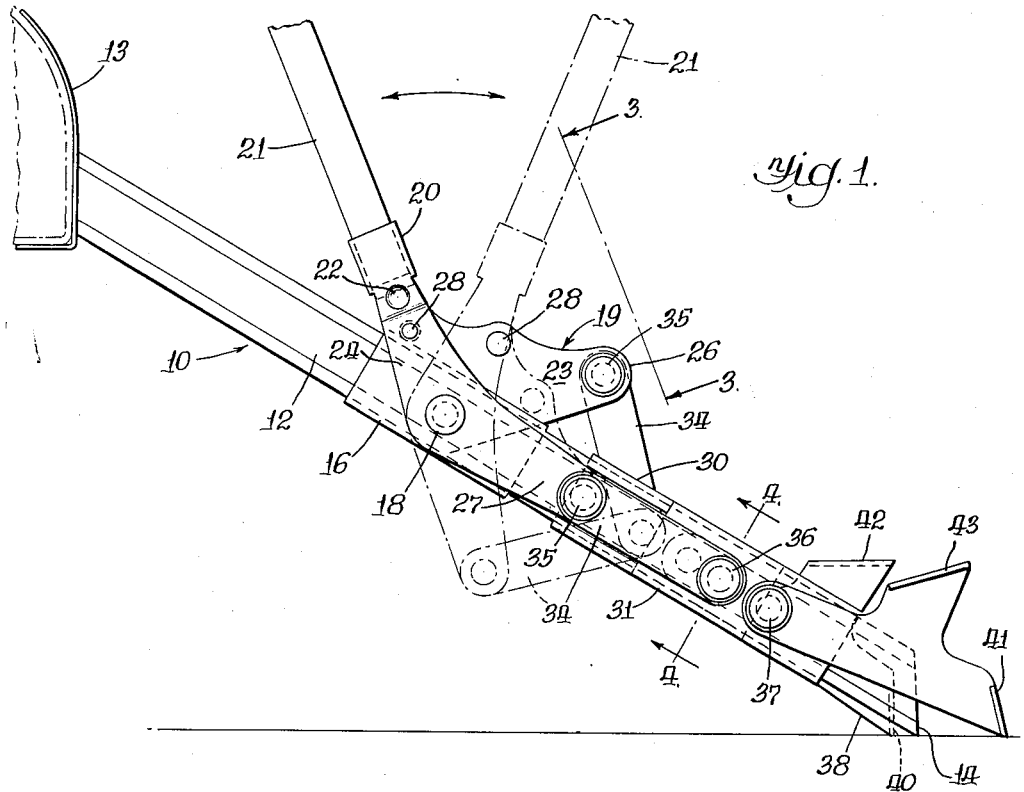
Fig. 1.
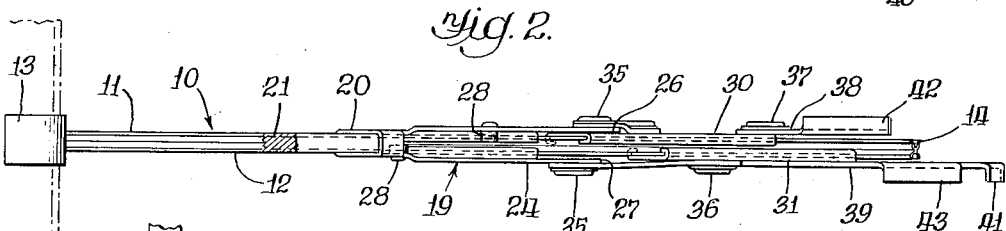
Fig. 2.
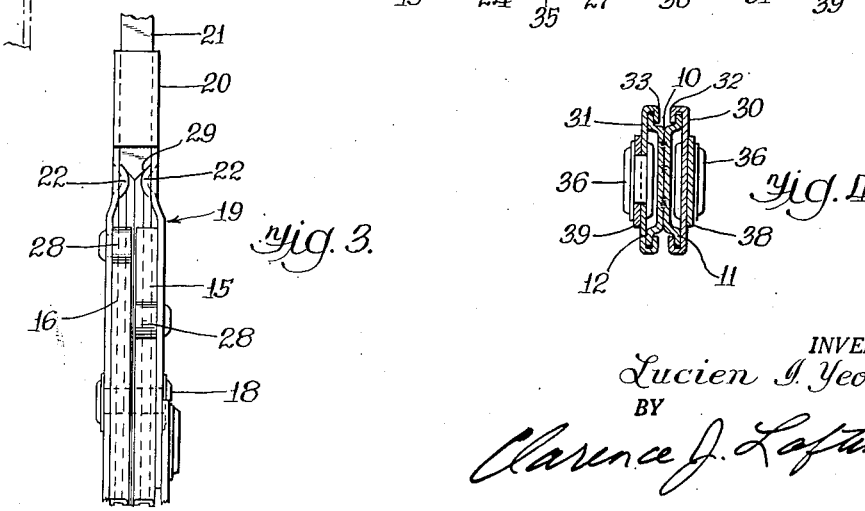
Fig. 3.
Fig. 4.
INVENTOR.
Lucien I. Yeomans
BY
Clarence J. Loftus  Atty.

United States Patent Office 2,760,755
Patented Aug. 28, 1956

2,760,755
AUTOMOBILE WALKER

Lucien I. Yeomans, Evanston, Ill., assignor, by mesne assignments, to Martha F. Watts, Chicago, Ill.

Application December 11, 1952, Serial No. 325,421

5 Claims. (Cl. 254—35)

This invention relates to means for moving automobiles by the direct thrust of a force applied against the frame bumpers, or other components of an automobile and reactance against the roadway, without the application of driving forces through the wheels or dependence upon friction between the wheels and the roadway.

It is a recognized fact that, when snow and ice conditions upon a roadway render it impossible to effect any substantial movement by means of torque applied to the wheels, on account of a low coefficient of friction between the tires and the roadway, the direct thrust that can be applied by several men will usually be sufficient to easily move the car the few feet necessary to position it where it may be driven, if there is clearance enough between it and other cars or obstructions for such manipulation and the man power is available.

Dynamometer tests have established that modern automobiles, free to move, upon a smooth roadway, may be set in motion by the application of a force amounting to as little as fifteen pounds of direct thrust per ton of dead weight, and not more than three times that force is required to effect such movement under very unfavorable roadway surface conditions.

I have availed myself of these facts in the construction of the apparatus to be herein described, which is in no way dependent upon application of torque to the wheels, or operation of the motor.

The principal object of the invention is to provide a manually operated walker for moving an automobile, forwardly or backwardly as desired, into a position where it may be moved in normal manner, and by a single person without assistance.

Another object is to provide a walker for standing automobiles which is operable in a very small clearance space.

Another object is to provide an automobile walker adapted to advance the automobile as far as may be in one direction and hold it against reverse motion while the steering wheels are appropriately adjusted preliminary to applying the device in a manner to move the automobile in the other direction.

Another object is to provide a convenient and portable facility by means of which traffic officers or others may remove obstructing cars from a roadway when they are damaged or unable to move under their own power.

It is also an object of the invention to provide a manually operated apparatus by means of which other cars, which may be too closely parked, may be moved to gain more clearance, regardless of whether or not they may be locked and/or their brakes set.

It is also an object of this invention to provide a relatively inexpensive apparatus which by manual operation is capable of exerting a powerful thrust against an automobile, with equivalent reactance against a roadway, by the exercise of comparatively slight manual effort.

A further object is to provide an apparatus for the purposes set forth which is light and compact and can be carried conveniently in available space within the body of an automobile.

This invention, as well as its stated, or obvious, objects and advantages, may be best understood from a study of the following description and the accompanying drawings, in which:

Figure 1 is a side elevational view of the apparatus, angularly disposed in a vertical plane to a roadway;

Figure 2 is a plan view of the apparatus when position as in Figure 1;

Figure 3 is a detail view of the operating mechanism of the device looking in the direction indicated by the line 3—3 of Figure 1; and Figure 4 is a detail sectional view taken substantially on the plane of the line 4—4 of Figure 1.

Referring to the drawings by reference numerals, it is noted that the preferred embodiment of the automobile walker comprises a unitary, fabricated, main thrust member generally designated by the reference numeral 10. Its components are two channel shaped members 11 and 12 permanently secured to each other in back-to-back relation by welding, or other suitable means, to form a girder-like structure of modified I-beam section as best shown in Figure 4. At one end of this girder-like structure is permanently mounted, by welding or otherwise, a bumper contact or push plate 13, adapted for free engagement with a substantial member of an automobile assemblage, and its opposite end is formed to create a sprag, as at 14, which is adapted to engage a roadway. The bumper contact 13 may, if desired, be detachably attached at the end of the girder-like structure, instead of being permanently mounted thereon, without impairing its utility or affecting its functioning.

At a mid point of the girder-like structure its members 11 and 12 are embraced by reinforcement members 15 and 16, which are welded to each other and to the girder-like structure members 11 and 12. Aligned pivot locating and supporting holes are established in the members 11, 12, 15 and 16, for the reception of an actuator pivot 18 as shown in Figure 1.

An actuator, indicated generally by the reference numeral 19, is rockably mounted upon the actuator pivot 18.

The actuator 19 is provided with a handle socket 20 adapted to receive a suitable handle 21, which is limited in its downward location by two projections 22 located in the actuator structure below the socket portion proper (Figure 3). The actuator 19 has side walls 23 and 24, in which holes are established for its mounting upon actuator pivot 18, and these side walls are extended to form toggle-link members 26 and 27, and are also provided with stop members 28 for limitation of the rocking travel in either direction of movement. Toggle joint pivot holes are provided in the toggle-link members 26 and 27.

The manual operation handle 21 is preferably constituted to also serve as a pick-bar, with one end chisel pointed and the opposite end suitably formed to serve as a hand grip. Its chisel faces 29 are adapted to engage the projections 22 of the actuator when it is functioning as an operating handle, and when functioning as a pick-bar the chisel point serves to chip away ice when wheels are frozen into the same, to break down obstructions, to condition the roadway, if necessary, for establishment of suitable reactance points, and to serve in obvious ways other than as an operating handle.

Sliding members 30 and 31 having inturned flanges 32 and 33 are freely mounted for reciprocation upon the members 11 and 12 of the main thrust member 10, and are connected by toggle-links 34 to the extended walls of the actuator 19, which constitute the toggle-link members 26 and 27, by means of toggle pivots 35 and slide pivots 36.

The sliding members 30 and 31 are also further provided with other pivots 37, by means of which drive fingers 38 and 39 are freely and pivotally mounted upon the sliding members 30 and 31.

The drive fingers 38 and 39 are provided with flanged portions 40 and 41 at their ends opposite their pivot points, which provide roadway engaging contacts, and in conveniently elevated portions are provided with other flanged portions 42 and 43, constituting foot supports for the application of other than gravity forces in contacting the drive fingers with the roadway when so desired.

In the use of the device, circumstances may be such that a simple manipulation only is required. The automobile walker may be placed with the contact portion of the main thrust member against and underneath a bumper and the sprag end of the same member upon the roadway.

The pick-bar handle is then inserted in the actuator socket and by its rocking, in first one and then the other direction, the toggle-joints are alternately opened and closed, the slides are alternately reciprocated, the driving fingers alternately engage and thrust against the roadway for the extent of their permissible movement and are then reversely returned to the position in which their thrust is initiated, the sprag progresses in a step-by-step movement along the roadway, and the automobile is advanced by the thrust in increments determined by the movement of the slides at each forward or backward rocking movement of the pick-bar handle.

During this action, if the automobile is suitably steered and there is no obstruction to its advance, it may be forced out of its difficulties and positioned where it may be driven further in the normal manner.

If minimum clearances and obstructions prevent such manipulation, the automobile may be extricated by alternate applications of the thrust at front and rear and a suitable adjustment of the steering wheels at each such alternate application of thrust, which in due course results in so positioning the automobile that it may be driven away in normal manner.

When desirable, the weight of the operator may be placed upon the driving fingers, and at no time is any operation of the automobile motor either necessary or desirable. Neither the automobile, nor the roadway, nor components of either, are elements of the device, but constitute the environment in which it may be used to advantage.

Having thus described my invention, what I claim as new and desire to secure by United States Letters Patent is:

1. In an automobile walker, the combination of an elongated main thrust member having a bumper contacting portion at one end and a roadway engaging sprag at the other end, an actuating member adapted for manual operation mounted rockably upon a pivot established upon said main thrust member at a point remote from its ends, integral arms of said actuating member constituting members of toggle linkages on each side of said main thrust member, slides mounted for reciprocation upon opposite sides of said main thrust member, connecting links between said slides and said actuating member arms constituting members of said toggle linkages, drive fingers rockably mounted upon said slides, said drive fingers each having a roadway engaging portion and an integral foot support.

2. An automobile walker comprising, in combination, an elongated thrust member adapted to carry a push plate at one end and having a pointed sprag at its opposite end whereby said thrust member may be extended diagonally downwardly between the bumper of an automobile and a roadway, with the pointed sprag directly engaging the surface of the roadway; said thrust member consisting of a pair of similar beams fastened together and oppositely disposed with respect to each other and having opposite pairs of longitudinal flanges therealong; a pair of oppositely disposed similar slide plates mounted for longitudinal reciprocal movement on opposite sides of the aforementioned beams and in sliding engagement with the flanges thereof; a pivot affixed to said thrust member intermediate its ends and an actuating crank carried on said pivot; an upright lever on said crank whereby the crank may be rocked back and forth by movement of said lever, and a pair of toggle links carried on and driven by said actuator crank and interconnected to said slide plates to effect reciprocation of said slides, with a pivoted drive finger mounted on each of said slides; each of said fingers having an elevated flange portion whereby they may be conveniently depressed and individually held in engagement with said roadway; the aforementioned actuating crank having the toggle links angularly offset from each other to bring about alternate reciprocation of said slide plates and drive fingers and facilitate constant engagement of the aforementioned sprag with the roadway.

3. An automobile walker comprising, in combination, an elongated thrust member adapted to carry a push plate at one end and having a pointed sprag at its opposite end whereby said thrust member may be extended diagonally downwardly between the bumper of an automobile and a roadway, with the pointed sprag directly engaging the surface of the roadway; a pair of oppositely disposed similar slide plates mounted for longitudinal reciprocal movement on opposite sides of the aforementioned thrust member and in sliding engagement therewith; a pivot affixed to said thrust member intermediate its ends and an actuating crank carried on said pivot; an upright lever on said crank whereby the crank may be rocked back and forth by movement of said lever, and a pair of toggle links carried on and driven by said actuator crank and interconnected to said slide plates to effect reciprocation of said slides, with a pivoted drive finger mounted on each of said slides; each of said fingers having an elevated flange portion whereby they may be conveniently depressed and individually held in engagement with said roadway; the aforementioned actuating crank having the toggle links angularly offset from each other to bring about alternate reciprocation of said slide plates and drive fingers and facilitate constant engagement of the aforementioned sprag with the roadway.

4. An automobile walker comprising, in combination, an elongated thrust member adapted to carry a push plate at one end and having a pointed sprag at its opposite end whereby said thrust member may be extended diagonally downward between the bumper of an automobile and a roadway, with the pointed sprag directly engaging the surface of the roadway; said thrust member consisting of a pair of similar beams fastened together and oppositely disposed with respect to each other and having opposite pairs of longitudinal flanges therealong; a pair of oppositely disposed similar slide plates mounted for longitudinal reciprocal movement on opposite sides of the aforementioned thrust member and in sliding engagement with the flanges thereof; a pivot affixed to said thrust member intermediate its ends and an actuating crank carried on said pivot; an upright lever on said crank whereby the crank may be rocked back and forth by movement of said lever, and a pair of toggle links carried on and driven by said actuator crank and interconnected to said slide plates to effect reciprocation of said slides, with a pivoted drive finger mounted on each of said slides; the aforementioned actuating crank havng the toggle links angularly offset from each other to bring about alternate reciprocation of said slide plates and drive fingers and facilitate constant engagement of the aforementioned sprag with the roadway.

5. An automobile walker comprising, in combination, an elongated thrust member adapted to carry a push plate at one end and having a pointed sprag at its opposite end whereby said thrust member may be extended diagonally downwardly between the bumper of an automibile and a roadway, with the pointed sprag directly engaging the surface of the roadway; a pair of oppositely disposed similar slide plates mounted for longitudinal reciprocal movement on opposite sides of the aforementioned thrust member and in sliding engagement therewith; a pivot affixed to said thrust member intermediate its ends and an actuating crank carried on said pivot; an upright lever on said crank whereby the crank may be rocked back and forth by movement of said lever, and a pair of toggle links carried on and driven by said actuator crank and interconnected to said slide plates to effect reciprocation of said slides, with a pivoted drive finger mounted on each of said slides; the aforementioned actuating crank having the toggle links angularly offset from each other to bring about alternate reciprocation of said slide plates and drive fingers and facilitate constant engagement of the aforementioned sprag with the roadway.

References Cited in the file of this patent
UNITED STATES PATENTS

| | | |
|---|---|---|
| 141,327 | Cowell | July 29, 1873 |
| 417,780 | Gillham et al. | Dec. 24, 1889 |
| 562,450 | Baxter | June 23, 1896 |
| 672,961 | Roisum | Apr. 30, 1901 |